US012798544B2

(12) United States Patent
Ganzel

(10) Patent No.: US 12,798,544 B2
(45) Date of Patent: Nov. 17, 2026

(54) BRAKE SYSTEMS WITH MASTER CYLINDERS, SINGLE-ACTING PLUNGER ASSEMBLIES, AND SECONDARY BRAKE MODULES

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

(*) Notice: Subject to any disclaimer, the term of this patent is extended or adjusted under 35 U.S.C. 154(b) by 417 days.

(21) Appl. No.: 18/514,099

(22) Filed: Nov. 20, 2023

(65) Prior Publication Data

US 2025/0162563 A1 May 22, 2025

(51) Int. Cl.

| | |
|---|---|
| ***B60T 17/22*** | (2006.01) |
| ***B60T 8/40*** | (2006.01) |
| ***B60T 13/66*** | (2006.01) |

(52) U.S. Cl.

CPC .......... *B60T 17/221* (2013.01); *B60T 8/4081* (2013.01); *B60T 13/662* (2013.01); *B60T 2270/406* (2013.01)

(58) Field of Classification Search

None

See application file for complete search history.

(56) References Cited

U.S. PATENT DOCUMENTS

| | | | | |
|---|---|---|---|---|
| 11,447,118 | B2 * | 9/2022 | Ganzel | B60T 17/22 |
| 2007/0210648 | A1 * | 9/2007 | Sato | B60T 13/161 303/155 |
| 2020/0207320 | A1 * | 7/2020 | Plewnia | B60T 13/745 |
| 2021/0155215 | A1 * | 5/2021 | Ganzel | B60T 11/20 |

FOREIGN PATENT DOCUMENTS

| | | | | |
|---|---|---|---|---|
| CN | 113147704 A | * | 7/2021 | B60T 7/042 |

OTHER PUBLICATIONS

Machine Translation CN113147704 (A) (No Date).*

* cited by examiner

*Primary Examiner* — Robert A. Siconolfi
*Assistant Examiner* — Shea Woodrow Irvin
(74) *Attorney, Agent, or Firm* — Tarolli, Sundheim, Covell & Tummino LLP

(57) ABSTRACT

A brake system includes a master cylinder operable during a backup braking mode to generate brake actuating pressure for hydraulically actuating first and second pairs of wheel brakes. A single-acting plunger ("SAP") assembly is operable during a normal non-failure braking mode to generate brake actuating pressure for hydraulically actuating at least one of the first and second pairs of wheel brakes. First and second two-position three-way valves are interposed hydraulically between the master cylinder, the SAP assembly, and a corresponding pair of wheel brakes for selectively providing pressurized hydraulic fluid from the master cylinder and/or the SAP assembly to the corresponding pair of wheel brakes. A secondary brake module selectively provides pressurized hydraulic fluid for actuating the first and second pairs of wheel brakes in at least one of a normal non-failure braking mode and a backup braking mode.

18 Claims, 2 Drawing Sheets

BRAKE SYSTEMS WITH MASTER CYLINDERS, SINGLE-ACTING PLUNGER ASSEMBLIES, AND SECONDARY BRAKE MODULES

RELATED APPLICATION

This application is related to the technologies disclosed in one or more of U.S. Provisional Patent Application No. 63/580,042, filed 1 Sep. 2023 and titled "Brake Systems with Motor-Driven Master Cylinders and Low Pressure Accumulators"; U.S. Provisional Patent Application No. 63/580,048, filed 1 Sep. 2023 and titled "Brake Systems with Motor-Driven Master Cylinders and Pump Inlet Attenuators"; U.S. patent application Ser. No. 18/474,714, filed 26 Sep. 2023 and titled "Brake Systems with Motor-Driven Master Cylinders and Pump Inlet Attenuators"; U.S. patent application Ser. No. 18/474,657, filed 26 Sep. 2023 and titled "Brake Systems with Motor-Driven Master Cylinders and Bypass Valves" (hereafter referenced as "the '657 application"); and U.S. patent application Ser. No. 18/474,678, filed 26 Sep. 2023 and titled "Brake Systems with Motor-Driven Master Cylinders and Low Pressure Accumulators"; the entire contents of all of which are incorporated herein by reference for all purposes.

TECHNICAL FIELD

This disclosure relates to an apparatus and method for use of brake systems with master cylinders and secondary brake modules, and, more particularly, to methods and apparatus of brake systems with master cylinders, single-acting plunger assemblies, and secondary brake modules.

BACKGROUND

A brake system may include anti-lock control including a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Descriptions of prior art brake systems are in U.S. Pat. No. 10,730,501, issued 4 Aug. 2020 to Blaise Ganzel and titled "Vehicle Brake System with Auxiliary Pressure Source", in U.S. Patent Application Publication No. 2020/0307538, published 1 Oct. 2020 by Blaise Ganzel and titled "Brake System with Multiple Pressure Sources", and in U.S. Patent Application Publication No. 2023/0048447, published 16 Feb. 2023 by Blaise Ganzel and titled "Apparatus and Method for Control of a Hydraulic Brake System Including Manual Pushthrough", all of which are incorporated herein by reference in their entirety for all purposes.

SUMMARY

In an aspect, alone or in combination with any other aspect, a brake system for actuating a plurality of wheel brakes comprising first and second pairs of wheel brakes is described. The system includes a reservoir and a master cylinder operable during a backup braking mode to generate brake actuating pressure at first and second MC outputs for hydraulically actuating the first and second pairs of wheel brakes, respectively. A single-acting plunger ("SAP") assembly is operable during a normal non-failure braking mode by actuation of an electric SAP drive motor to generate brake actuating pressure at a SAP output for hydraulically actuating at least one of the first and second pairs of wheel brakes. First and second two-position three-way valves are interposed hydraulically between the master cylinder, the SAP assembly, and a corresponding one of the first and second pairs of wheel brakes for selectively providing pressurized hydraulic fluid from a chosen one of the master cylinder and the SAP assembly to the corresponding one of the first and second pairs of wheel brakes. A secondary brake module is configured for selectively providing pressurized hydraulic fluid at first and second pump outputs for actuating the first and second pairs of wheel brakes in at least one of a normal non-failure braking mode and a backup braking mode. The secondary brake module includes an electric SBM motor configured to selectively pressurize the hydraulic fluid by transmitting rotary motion to at least two pump pistons. Each pump piston provides pressurized hydraulic fluid to a corresponding one of the first and second pump outputs. Each of the first and second pump outputs provides fluid to a corresponding one of the first and second pairs of wheel brakes. An electronic control unit is provided for controlling at least one of the secondary brake module and the SAP assembly responsive to at least one brake pressure signal.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
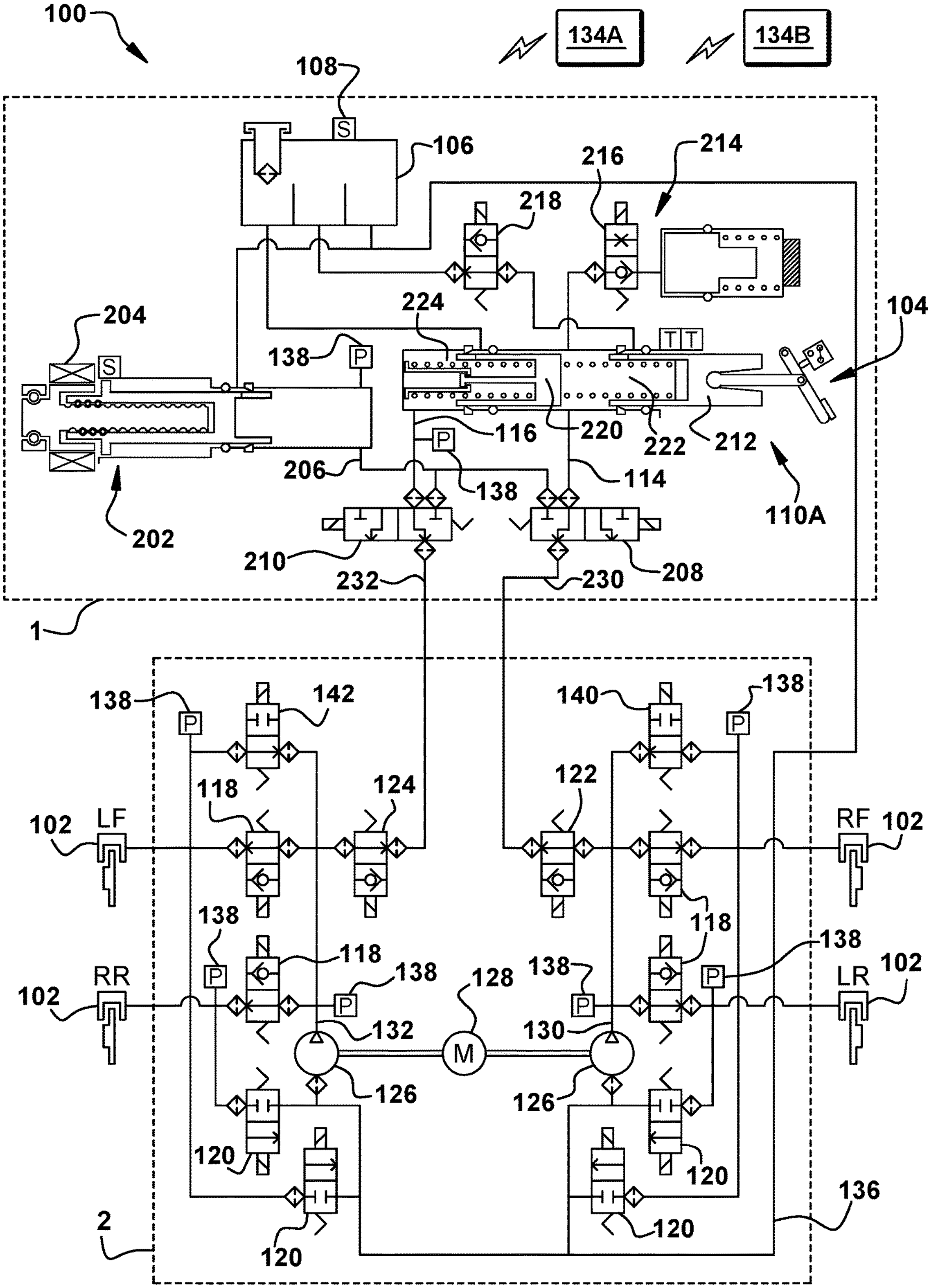
FIG. 1 is a schematic hydraulic diagram of an example brake system according to an aspect of the present invention.
Figure 2:
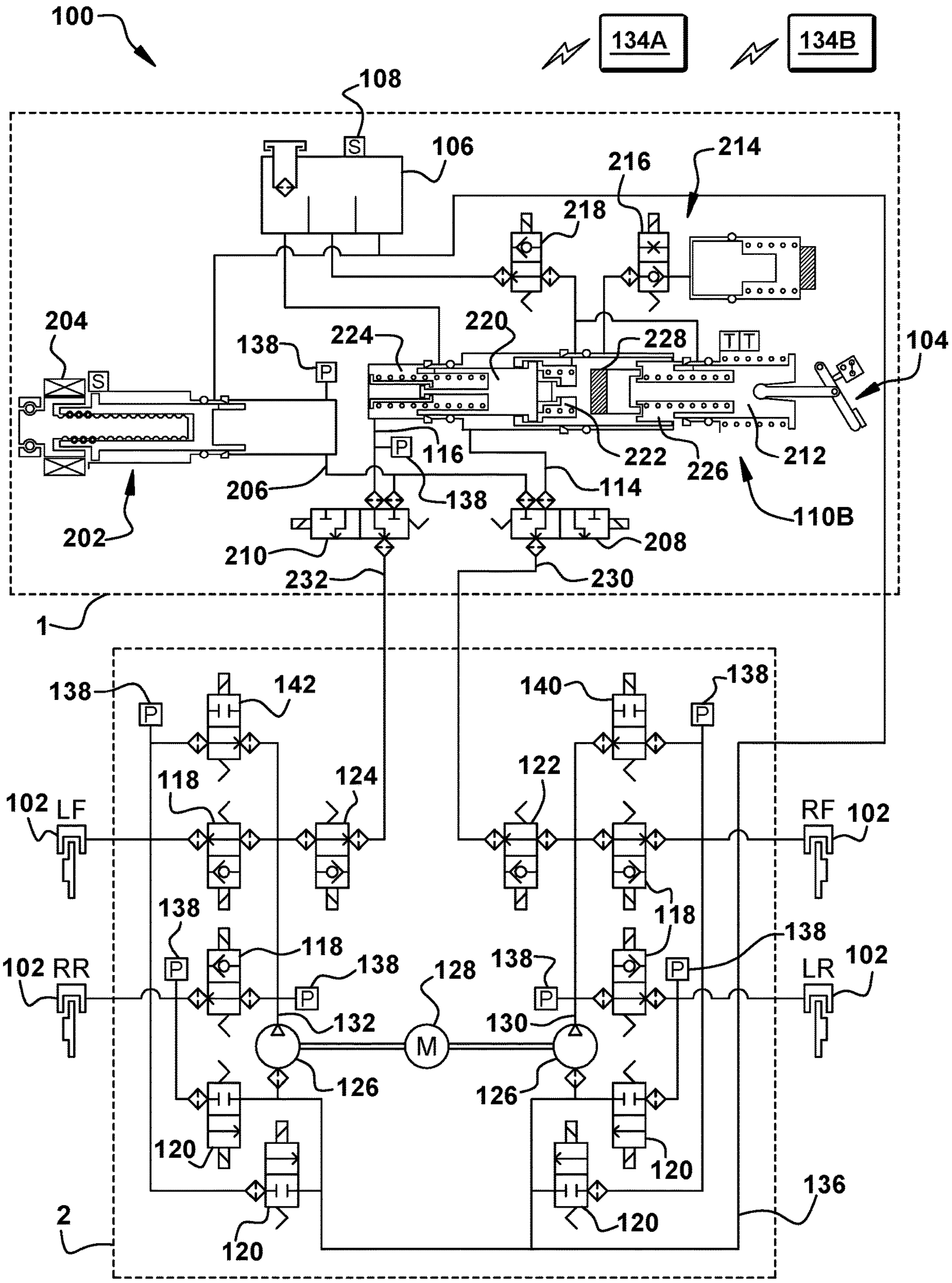
FIG. 2 is a schematic hydraulic diagram of an example brake system according to another aspect of the present invention.

FIGS. 1-2 schematically depicts example brake systems 100 for actuating a plurality of wheel brakes 102. The brake systems 100 are shown here as a hydraulic braking system, in which fluid pressure is utilized to apply braking forces for the brake system 100. The brake system 100*s* may suitably be used on a ground vehicle, such as an automotive vehicle having four wheels with a wheel brake associated with each wheel. Furthermore, the brake system 100*s* can be provided with other braking functions such as anti-lock braking (ABS) and other slip control features to effectively brake the vehicle. Components of the brake systems 100 may be housed in one or more blocks or housings. The blocks or housings may be made from solid material, such as aluminum, that has been drilled, machined, or otherwise formed to house the various components. Fluid conduits may also be formed in the block or housing.

In the illustrated embodiments of the brake systems 100 of FIGS. 1-2, there are four wheel brakes 102, which each can have any suitable wheel brake structure operated electrically and/or by the application of pressurized brake fluid. Each of the wheel brakes 102 may include, for example, a brake caliper mounted on the vehicle to engage a frictional element (such as a brake disc) that rotates with a vehicle wheel to effect braking of the associated vehicle wheel. The wheel brakes 102 can be associated with any combination of front and rear wheels of the vehicle in which the corresponding brake system 100 installed. For example, the brake systems 100 may each be configured as a vertically split or diagonally split system. No differentiation is made herein among the construction or configuration of the various wheel brakes 102, for the purposes of this description, though one of ordinary skill in the art could readily provide a suitable braking arrangement for a particular use environment. The wheel brakes 102 are described herein as comprising first and second pairs of wheel brakes 102, with the first and second pairs being characterized as RF/LR and LF/RR, as shown in FIGS. 1-2, for the sake of description. However, LF/LR and RF/RR, or RF/LF and RR/LR, pairs could also or instead be specified for the brake systems 100, as desired.

Also for the sake of description, it is presumed that a brake pedal assembly (shown schematically at 104) is configured to provide a braking signal, in a wired or wireless manner, corresponding to a desired braking action by an operator of the vehicle. The brake pedal assembly 104 can include one or more travel sensors "T" (two shown in the Figures, for redundancy) for producing a brake signal responsive to an actuation force input from an operator of the vehicle (e.g., by applying pressure to a brake pedal assembly 104). The brake systems 100 are actuated responsive to at least one of the brake signal (in at least a normal non-failure mode of operation) and the actuation force (in at least a manual push-through operation of a backup braking mode of operation), as will be discussed in more detail below.

The brake systems 100 also include a fluid reservoir 106. The reservoir 106 stores and holds hydraulic fluid for the brake system 100. The fluid within the reservoir 106 is preferably held at or about atmospheric pressure, but the fluid may be stored at other pressures if desired. The reservoir 106 is shown schematically as having three tanks or sections in FIGS. 1-2, with fluid conduit lines connected thereto. The sections can be separated by several interior walls within the reservoir 106 and are provided to prevent complete drainage of the reservoir 106 in case one of the sections is depleted due to a leakage via one of the three lines connected to the reservoir 106. Alternatively, the reservoir 106 may include multiple separate housings. The reservoir 106 may include at least one fluid level sensor 108 for detecting the fluid level of one or more of the sections of the reservoir 106.

A manually actuated master cylinder ("MC" or "[primary] power transmission unit") 110 of each brake system 100 functions as a first source of pressure to provide a desired pressure level to the hydraulically operated wheel brakes 102 during a typical or normal non-failure brake apply. The master cylinder 110 is operable during a normal non-failure braking mode, such as by actuation by a user/operator of the vehicle of the brake pedal assembly 104 attached to the master cylinder 110, to generate brake actuating pressure at first and second MC outputs 114 and 116, respectively, for hydraulically actuating the first and second pairs of wheel brakes 102.

With reference to the Figures, the brake systems 100 depicted each include a single-acting plunger ("SAP") assembly 202 operable during a normal non-failure braking mode by actuation of an electric SAP drive motor 204 to generate brake actuating pressure at a SAP output 206 for hydraulically actuating at least one of the first and second pairs of wheel brakes 102. First and second two-position three-way valves 208 and 210, respectively, are interposed hydraulically between the master cylinder 110, the SAP assembly 202, and a corresponding one of the first and second pairs of wheel brakes 102 for selectively providing pressurized hydraulic fluid from a chosen one of the master cylinder 110 and the SAP assembly 202 to the corresponding one of the first and second pairs of wheel brakes 102. That is, in a normal non-failure mode brake apply, the brake pedal assembly 104 of the master cylinder 110 is sending a brake signal to the SAP assembly 202 to actuate the wheel brakes 102.

More specifically, at least one travel sensor T is operatively coupled to an input piston 212 of the master cylinder 110 (which is mechanically coupled to the input piston 212 of the master cylinder 110). The at least one travel sensor T is configured to provide a braking signal, in a wired or wireless manner, corresponding to a desired braking action by an operator of the vehicle. An electronic control unit 134 (as will be discussed in more detail below) controls at least one of a secondary brake module and the SAP assembly 202 responsive to the braking signal. In many normal non-failure mode brake apply instances, the first and second two-position three-way valves 208 and 210 are also energized (e.g., by the electronic control module) to route pressurized hydraulic fluid from the SAP assembly 202 to the respective pairs of wheel brakes 102.

A brake simulator (shown generally at 214) in fluid communication with a selected chamber of the master cylinder 110 is employed to provide expected pedal "feel" for the brake pedal assembly 104 during at least the normal non-failure braking mode, such as by routing hydraulic fluid through a simulator valve 216 hydraulically interposed between the brake simulator 214 and the master cylinder 110. When a brake simulator 214 is present, a simulator test valve 218 may be hydraulically interposed between the reservoir 106 and at least one chamber of the master cylinder 110. The simulator test valve 218 is operable during a test mode of the brake system 100, outside of normal braking operations, to assist with testing the brake simulator 214 or any other component of the brake system 100. One of ordinary skill in the art can readily provide any desired brake simulation and testing scheme for a particular use environment of the brake systems 100.

If the fault-tolerant brake systems 100 of FIGS. 1-2 are in a backup braking mode, however, the master cylinder 110 may be actuated to produce pressurized brake fluid via actuating force manually applied by an operator of the vehicle upon the brake pedal assembly 104, which is mechanically coupled to the input piston 212 of the master cylinder 110. This "push-through" backup braking is facilitated by the de-energized position of the first and second two-position three-way valves 208 and 210, placing the master cylinder 110 in fluid communication with the first and second pairs of wheel brakes 102 via first and second MC outputs 114 and 116, respectively.

Through use of the master cylinder 110 and/or the SAP assembly 202 providing pressurized hydraulic fluid to the wheel brakes 102 during at least one mode of the brake systems 100 shown in FIGS. 1-2, an "IBC" (Integrated Brake Control) type braking function can be provided to a vehicle, including a fault-tolerant architecture that may be desirable in some use environments.

With reference now to FIG. 1, the master cylinder 110 is shown as a dual-chamber master cylinder 110A in the depicted aspect of the present invention. The dual-chamber master cylinder 110A has an input piston 212 (functioning as a primary piston) mechanically attached to the brake pedal assembly 104, and a secondary piston 220 coupled to the input piston 212 and driven thereby. The first and second MC outputs 114 and 116 are in fluid connection with the primary and secondary chambers 222 and 224, respectively, for selectively receiving pressurized fluid therefrom. The brake simulator 214 and simulator test valve 218 may be in fluid connection with the primary chamber 222 during predetermined amounts of actuation (e.g., unactuated) of the master cylinder 110.

Referring to FIG. 2, though, the master cylinder 110 is shown as a triple-chamber master cylinder 110B in the depicted aspect of the present invention. The triple-chamber master cylinder 110B has an input piston 212 mechanically attached to the brake pedal assembly 104 and pressurizing an input chamber 226 in fluid communication with the simulator valve 216. Both a primary piston 228 and the secondary piston 220 are coupled to the input piston 212 and driven (directly or indirectly) thereby. The first and second MC outputs 114 and 116 are in fluid connection with the primary and secondary chambers 222 and 224, respectively, for selectively receiving pressurized fluid therefrom. The brake simulator 214 and simulator test valve 218 may both be in fluid connection with the input chamber 226 of the master cylinder 110B when the simulator valve 216 is open.

As this difference in master cylinder 110 type is a main point of differentiation between the brake systems 100 shown in FIGS. 1 and 2, the discussion in the present application pertaining to other aspects of the brake systems 100 should be considered to apply commensurately with both of the brake systems 100 depicted in the Figures when no distinction is made or readily apparent from context. One of ordinary skill in the art will be able to provide any desired configuration(s) of master cylinder(s) 110 to any brake system 100 following the teachings herein, for a particular use environment.

After a brake apply, fluid from the wheel brakes 102 may be returned to the master cylinder 110, returned to the SAP assembly 202, and/or be diverted to the reservoir 106 for the brake systems 100 of FIGS. 1-2. It is also contemplated that other configurations (not shown) of the brake systems 100 could include hydraulic control of just selected one(s) of the wheel brakes (with the others being electrically controlled/actuated). One of ordinary skill in the art would be readily able to provide such an arrangement for a desired use environment, following aspects of the present invention.

An iso/dump control valve arrangement may be associated with each wheel brake 102 of the plurality of wheel brakes 102. Each iso/dump control valve arrangement includes an iso valve 118 and a dump valve 120, for providing desired fluid routing to an associated wheel brake 102. The reservoir 106 is hydraulically connected to the master cylinder 110 and to each of the iso/dump control valve arrangements, such as via the return line 136. The iso/dump control valve arrangements may each include respective serially arranged iso and dump valves 118 and 120. The normally open iso valve 118 for each iso/dump control valve arrangement is located hydraulically between a respective wheel brake 102 and the master cylinder 110, and the normally closed dump valve 120 for each iso/dump control valve arrangement is located hydraulically between a respective wheel brake 102 and the reservoir 106, for the corresponding wheel brake 102. More specifically, each iso/dump control valve arrangement may be in fluid communication with both a selected one of the first and second two-position three-way valves 208 and 210 and a selected one of the first and second pump outputs 130 and 132 for selectively receiving pressurized hydraulic fluid therefrom.

The iso/dump control valve arrangements may selectively provide slip control to at least one wheel brake 102 powered by the master cylinder 110, the SAP assembly 202, and/or the secondary brake module described below. More broadly, the iso/dump control valve arrangement, and/or other valves of the brake system 100, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking. As shown in the Figures, it is contemplated that an iso/dump control valve arrangement may be associated with each wheel brake 102 of the first and second pairs of wheel brakes.

A first traction control iso valve 122 may be hydraulically interposed between the first two-position three-way valve 208 and the first pair of wheel brakes 102 via a first three-way output 230, for receiving pressurized hydraulic fluid from the SAP assembly 202 and/or the master cylinder 110 and selectively routing the pressurized hydraulic fluid to actuate the first pair of wheel brakes 102. A second traction control iso valve 124 may be hydraulically interposed between the second two-position three-way valve 210 and the second pair of wheel brakes 102 via a second three-way output 232, for receiving pressurized hydraulic fluid from the SAP assembly 202 and/or the master cylinder 110 and selectively routing the pressurized hydraulic fluid to actuate the second pair of wheel brakes.

A pump piston 126 may be associated with at least one wheel brake 102 of the plurality of wheel brakes 102. The pump piston 126 is driven by an electric SBM motor 128 which transmits rotary motion to each pump piston 126 for selectively providing pressurized hydraulic fluid to the iso/dump control valve arrangement of at least one wheel brake 102 which is associated with the pump piston 126. FIGS. 1-2 show one pump piston 126 as being associated with two wheel brakes 102, for a total of two pump pistons 126 in the depicted brake systems 100. Together, the pump piston(s) 126 and electric SBM motor 128 can be considered to comprise a secondary brake module of the brake systems 100. For example, the two pump pistons 126 shown in the Figures may provide pressurized hydraulic fluid at first and second pump outputs 130 and 132, respectively, to the corresponding wheel brakes 102 via the corresponding iso/dump control valve arrangements (when present), to actuate the first and second pairs of wheel brakes 102 in at least one of a normal non-failure braking mode and a backup braking mode. Each of the first and second pump outputs 130 and 132 can provide fluid to a corresponding one of the first and second pairs of wheel brakes 102. It is contemplated that a plurality of pump pistons 126 could be associated with each of the first and second pump outputs 130 and 132, in some configurations of the brake system 100.

The secondary brake modules (A.K.A. "secondary power transmission units") of the brake systems 100 function as a source of pressure to provide a desired pressure level to selected ones of the wheel brakes 102 in a backup or "failed" situation, when, for some reason, another source of pressurized fluid in the brake system 100 is unable to provide fluid to those selected wheel brakes 102. Accordingly, each of the secondary brake modules is directly fluidly connected to the reservoir 106, for exchanging hydraulic fluid between these components without having to route the fluid through a (potentially failed) master cylinder 110, SAP assembly 202, or another structure of the brake system 100.

The secondary brake modules can be used to selectively provide hydraulic fluid to at least one of the wheel brakes 102 in a backup braking mode, but also in an enhanced braking mode, which can occur on its own and/or concurrently with either the backup braking mode or a non-failure normal braking mode. Examples of suitable enhanced braking mode functions available to the brake systems 100 include, but are not limited to, "overboost" (in which higher pressure is provided to a particular brake than would normally be available from the master cylinder 110 and/or single-acting plunger assembly) and "volume-add" (in which more fluid is provided to a particular brake than would normally be available from the master cylinder 110 and/or single-acting plunger assembly). These enhanced braking modes may be facilitated, in some use environments, by fluid communication from the respective first or second MC output 114 or 116 to a pump input of at least one pump piston 126 for selectively supplying pressurized hydraulic fluid to the pump piston(s) 126. For example, in at least one of the normal non-failure braking mode and the backup braking mode, the secondary brake module can then supply boosted-pressure (above what was obtained from the master cylinder 110 and/or single-acting plunger assembly) hydraulic fluid to at least one of the first and second pump outputs 130 or 132.

As can be seen, each iso/dump control valve arrangement in the brake systems 100 shown in the Figures is in direct or indirect fluid communication with both a selected one of the first and second two-position three-way valves 208 and 210 and a selected one of the first and second pump outputs 130 and 132 for selectively receiving pressurized fluid therefrom, such as during different braking modes or otherwise as desired. One of ordinary skill in the art will be readily able to configure a brake system 100 for any particular use application as desired.

The brake system 100 shown in FIGS. 1-2 also includes at least one electronic control unit ("ECU") 134, for controlling at least one of the SAP assembly 202 (via electric SAP drive motor 204) and the secondary brake module (via electric SBM motor 128) responsive to at least one brake pressure signal, with first and second ECUs 134A, 134B being shown and described herein. The ECUs 134A, 134B may include microprocessors and other electrical circuitry. The ECUs 134A, 134B receive various signals, process signals, and control the operation of various electrical components of a corresponding brake system 100 in response to the received signals, in a wired and/or wireless manner. The ECUs 134A, 134B can be connected to various sensors such as the reservoir fluid level sensor(s) 108, pressure sensors, travel sensors, switches, wheel speed sensors, and steering angle sensors. The ECUs 134A, 134B may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECUs 134A, 134B may be connected to the instrument cluster for collecting and supplying information related to warning indicators such as an ABS warning light, a brake fluid level warning light, and a traction control/vehicle stability control indicator light. It is contemplated that at least one of the ECUs 134A and 134B may be, for example, integrated with the SAP assembly 202 or the electric SBM motor 128.

The first and second ECUs 134A and 134B may divide the control tasks for the brake systems 100 in any desired manner, and may be readily configured by one of ordinary skill in the art for a particular use environment of a brake system, though it is contemplated that any control tasks performed by one or more ECUs 134 will be accomplished responsive to at least one brake pressure signal and/or a braking signal produced by the brake pedal assembly 104. For example, the first ECU 134A may be operative to control the electric SAP drive motor 204. The second ECU 134B may be operative to control the electric SBM motor 128 of the secondary brake module, at least one of the iso/dump control valve arrangements, and/or at least one of the first and second traction control iso valves 122, 124.

A "brake pressure signal" is referenced above as being at least one input that an ECU 134 may consider and responsively control one or more other components of the brake system 100, to achieve desired braking results for a particular use environment. One potential source of the brake pressure signal is a brake pressure sensor. For example, and as shown in the Figures, the brake system 100 can include at least one, such as at least two, brake pressure sensors 138, with a first brake pressure sensor 138 being interposed hydraulically between the first two-position three-way valve 208 and the first pair of wheel brakes 102, and a second brake pressure sensor 138 being interposed hydraulically between the second two-position three-way valve 210 and the second pair of wheel brakes 102. The term "interposed hydraulically", as used here, could include direct and/or indirect interposition of the so-described components.

In another configuration, the first brake pressure sensor 138 may be interposed hydraulically between the first two-position three-way valve 208 and a front brake of the first pair of wheel brakes 102, and a second brake pressure sensor 138 may be interposed hydraulically between the second two-position three-way valve 210 and a front brake of the second pair of wheel brakes 102. A third brake pressure sensor 138 may then be interposed hydraulically between the first two-position three-way valve 210 and a rear brake of the first pair of wheel brakes 102, and a fourth brake pressure sensor 138 may be interposed hydraulically between the second two-position three-way valve 210 and a rear brake of the second pair of wheel brakes 102.

For certain use environments, each brake pressure sensor 138 optionally (and as shown in some of the brake sensors 138 in the Figures) may be located directly hydraulically adjacent a corresponding wheel brake 102 for sensing hydraulic pressure at the corresponding wheel brake 102 and responsively producing a brake pressure signal. In other words, and in the brake systems 100 shown in FIGS. 1-2, there is no other component interposed hydraulically between certain of the brake pressure sensors 138 and their corresponding wheel brake 102, so that the brake pressure signal produced by each brake pressure sensor 138 correlates with an actual sensed brake pressure at the corresponding wheel brake 102.

As an example configuration also shown in FIGS. 1-2, a first brake pressure sensor 138 may be interposed hydraulically between the first two-position three-way valve 208 and an output side of a first pump piston 126 of the secondary brake module, and a second brake pressure sensor 138 may be interposed hydraulically between the second two-position three-way valve 210 and an output side of a second pump piston 126 of the secondary brake module. In this case, when brake pressure sensors 138 are provided at the first and second pump outputs 130 and 132, the brake pressure sensors 138 located directly hydraulically adjacent to the wheel brakes 102 may be omitted while still allowing the ECUs 134A, 134B to receive substantially equivalent information for controlling one or more other components of the brake systems 100.

One of ordinary skill in the art can readily provide a desired number/position/type of pressure sensors 138 for a particular brake system 100. Regardless of type, position, configuration, and any other physical factors, however, each of the brake pressure sensors 138 is configured to generate a brake pressure signal responsive to a sensed hydraulic fluid pressure. The ECUs 134A, 134B are configured to accept a brake pressure signal from at least one brake pressure sensor 138 and control at least one other component of the brake systems 100 shown in FIGS. 1-2 responsively.

A first bypass iso valve 140 may be hydraulically interposed between the first traction control iso valve 122 and a front brake of the first pair of wheel brakes 102, such as in parallel with the iso/dump control valve arrangement corresponding to the front brake of the first pair of wheel brakes 102. A second bypass iso valve 142 may be hydraulically interposed between the second traction control iso valve 124 and a front brake of the second pair of wheel brakes 102, such as in parallel with the iso/dump control valve arrangement corresponding to the front brake of the second pair of wheel brakes 102. The first and second bypass iso valves 140 and 142 shown in FIGS. 1-2 are shown as being normally open iso valves and may be similar, for example, to the bypass iso valves shown and described in the previously mentioned '657 application.

The first and second bypass iso valves 140 and 142 are oriented in an opposite fluid flow direction as is the iso valve 118 of the corresponding iso/dump control valve arrangement (i.e., plumbed in a "reverse" direction to the corresponding iso valves 118). This allows a larger orifice to be used with the relatively small solenoid of the first and second bypass iso valves 140 and 142 because high pressure is not trying to open the valve during slip control. As a result, the first and second bypass iso valves 140 and 142 can thus help pressurize the wheel brakes 102 quickly during a "spike apply" situation.

An electric brake motor (not shown) may be associated with each of the rear wheel brakes of the front and rear pairs of wheel brakes 102. When present, the electric brake motors may be operative in at least the backup braking mode and may be controlled by an opposite ECU 134 (responsive to the braking signal) as is the electric SAP drive motor 204 of the SAP assembly 202, when multiple ECUs 134 are present. For example, when the first ECU 134A controls the electric SAP drive motor 204 of the SAP assembly 202, the second ECU 134B may control the electric SBM motor 128 (of the secondary brake module) and/or the electric brake motors 144, for redundancy in the brake system 100 if the first ECU 134A should fail.

As shown in the brake system 100 of FIG. 1, the reservoir 106, master cylinder 110, and SAP assembly 202 may be co-located in a first housing (indicated schematically by dashed line "1" in those Figures), and the secondary brake module may be located in a second housing (indicated schematically by dashed line "2" in those Figures), spaced apart from the first housing. Optionally, and also as shown in FIG. 1, the iso/dump control valve arrangements, the first and second bypass iso valves 140 and 142, and/or the first and second traction control iso valves 122 and 124 may also be located in the second housing.

The first and second housings (and included/co-located components) of any brake systems 100 may be provided and configured for a particular use application by one of ordinary skill in the art based upon factors including, but not limited to, achieving desired outcomes in at least one of design, manufacturing, service, spatial utilization in the vehicle, cost, size, regulatory compliance, or the like.

It is contemplated that various other components, such as electric service and/or parking brake motors, could be provided by one of ordinary skill in the art to achieve desired configurations for particular use environments, in any of the brake systems described herein. For example, while a number of filters and pressure or other sensors are shown in the Figures, specific description thereof has been omitted herefrom for brevity, as one of ordinary skill in the art will readily understand how to provide a desired number, placement, and/or operation of filters, sensors, and any other components as desired for a particular use environment of the present invention.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for actuating a plurality of wheel brakes comprising first and second pairs of wheel brakes, the system comprising:

a reservoir;

a master cylinder operable during a backup braking mode to generate brake actuating pressure at first and second MC outputs for hydraulically actuating the first and second pairs of wheel brakes, respectively;

a single-acting plunger ("SAP") assembly operable during a normal non-failure braking mode by actuation of an electric SAP drive motor to generate brake actuating pressure at a SAP output for hydraulically actuating at least one of the first and second pairs of wheel brakes;

first and second two-position three-way valves interposed hydraulically between the master cylinder, the SAP assembly, and a corresponding one of the first and second pairs of wheel brakes for selectively providing pressurized hydraulic fluid from a chosen one of the master cylinder and the SAP assembly to the corresponding one of the first and second pairs of wheel brakes;

a first traction control iso valve hydraulically interposed between the first two-position three-way valve and the first pair of wheel brakes via a first three-way output, and a second traction control iso valve hydraulically interposed between the second two-position three-way valve and the second pair of wheel brakes via a second three-way output;

a first bypass iso valve hydraulically interposed between the first traction control iso valve and a front brake of the first pair of wheel brakes, and a second bypass iso valve hydraulically interposed between the second traction control iso valve and a front brake of the second pair of wheel brakes;

a secondary brake module configured for selectively providing pressurized hydraulic fluid at first and second pump outputs for actuating the first and second pairs of wheel brakes in at least one of a normal non-failure braking mode and a backup braking mode, the secondary brake module including an electric SBM motor configured to selectively pressurize the hydraulic fluid by transmitting rotary motion to at least two pump pistons, each pump piston providing pressurized hydraulic fluid to a corresponding one of the first and second pump outputs, each of the first and second pump outputs providing fluid to a corresponding one of the first and second pairs of wheel brakes; and an electronic control unit for controlling at least one of the secondary brake module and the SAP assembly responsive to at least one brake pressure signal.

2. The brake system of claim 1, including an iso/dump control valve arrangement associated with each wheel brake of the plurality of wheel brakes, each iso/dump control valve arrangement being controlled by the electronic control unit.

3. The brake system of claim 2, wherein each iso/dump control valve arrangement is in fluid communication with both a selected one of the first and second two-position three-way valves and a selected one of the first and second pump outputs for selectively receiving pressurized hydraulic fluid therefrom.

4. The brake system of claim 1, wherein a first brake pressure sensor is interposed hydraulically between the first two-position three-way valve and the first pair of wheel brakes, and a second brake pressure sensor is interposed hydraulically between the second two-position three-way valve and the second pair of wheel brakes, each of the first and second brake pressure sensors being configured to generate a brake pressure signal responsive to a sensed hydraulic fluid pressure.

5. The brake system of claim 4, wherein the first brake pressure sensor is interposed hydraulically between the first two-position three-way valve and a front brake of the first pair of wheel brakes, and a second brake pressure sensor is interposed hydraulically between the second two-position three-way valve and a front brake of the second pair of wheel brakes, and wherein a third brake pressure sensor is interposed hydraulically between the first two-position three-way valve and a rear brake of the first pair of wheel brakes, and a fourth brake pressure sensor is interposed hydraulically between the second two-position three-way valve and a rear brake of the second pair of wheel brakes, each of the third and fourth brake pressure sensors being configured to generate a brake pressure signal responsive to a sensed hydraulic fluid pressure.

6. The brake system of claim 1, wherein a first brake pressure sensor is interposed hydraulically between the first two-position three-way valve and a an output side of a first pump piston of the secondary brake module, and a second brake pressure sensor is interposed hydraulically between the second two-position three-way valve and an output side of a second pump piston of the secondary brake module, each of the first and second brake pressure sensors being configured to generate a brake pressure signal responsive to a sensed hydraulic fluid pressure.

7. The brake system of claim 1, wherein the master cylinder is a dual-chamber master cylinder.

8. The brake system of claim 1, wherein the master cylinder is a triple-chamber master cylinder.

9. The brake system of claim 1, wherein the master cylinder is actuated to produce pressurized brake fluid via actuating force manually applied by an operator of the vehicle upon a brake pedal assembly mechanically coupled to an input piston of the master cylinder.

10. The brake system of claim 1, wherein a first brake pressure sensor is interposed hydraulically between the first traction control valve and the first pair of wheel brakes, and a second brake pressure sensor is interposed hydraulically between the second traction control valve and the second pair of wheel brakes, each of the first and second brake pressure sensors being configured to generate a brake pressure signal responsive to a sensed hydraulic fluid pressure.

11. The brake system of claim 2, wherein the first bypass iso valve is hydraulically interposed between the first traction control iso valve and the front brake of the first pair of wheel brakes in parallel with the iso/dump control valve arrangement corresponding to the front brake of the first pair of wheel brakes, and wherein the second bypass iso valve is hydraulically interposed between the second traction control iso valve and the front brake of the second pair of wheel brakes in parallel with the iso/dump control valve arrangement corresponding to the front brake of the second pair of wheel brakes.

12. The brake system of claim 1, including an iso/dump control valve arrangement associated with each wheel brake of the first and second pairs of wheel brakes, wherein the first traction control iso valve is hydraulically interposed between the first two-position three-way valve and the iso/dump control valve arrangements of the first pair of wheel brakes, and wherein the second traction control iso valve is hydraulically interposed between the second two-position three-way valve and the iso/dump control valve arrangements of the second pair of wheel brakes.

13. The brake system of claim 1, wherein the electronic control unit is a first electronic control unit controlling the SAP assembly, and the brake system includes a second electronic control unit controlling the secondary brake module, wherein both the first and second electronic control units control the respective SAP assembly and secondary brake module responsive to at least one brake pressure signal.

14. The brake system of claim 1, including at least one travel sensor operatively coupled to an input piston of the master cylinder, the at least one travel sensor being configured to provide a braking signal, in a wired or wireless manner, corresponding to a desired braking action by an operator of the vehicle, wherein the electronic control unit controls at least one of the secondary brake module and the SAP assembly responsive to the braking signal.

15. The brake system of claim 1, wherein the reservoir, master cylinder, and SAP assembly are co-located in a first housing and the secondary brake module is located in a second housing, spaced apart from the first housing.

16. The brake system of claim 1, including a simulator test valve hydraulically interposed between the reservoir and at least one chamber of the master cylinder, the simulator test valve being operable during a test mode of the brake system.

17. The brake system of claim 1, including a brake simulator in fluid communication with a selected chamber of the master cylinder.

18. The brake system of claim 17, including a simulator valve hydraulically interposed between the brake simulator and the master cylinder.

* * * * *